Aug. 28, 1928.

E. H. McKINNEY 1,682,085

HYDRAULIC CLUTCH TRANSMISSION

Filed March 23, 1925    2 Sheets-Sheet 1

INVENTOR.
EDWARD H. McKINNEY.
BY
E. Y. Charles
ATTORNEY.

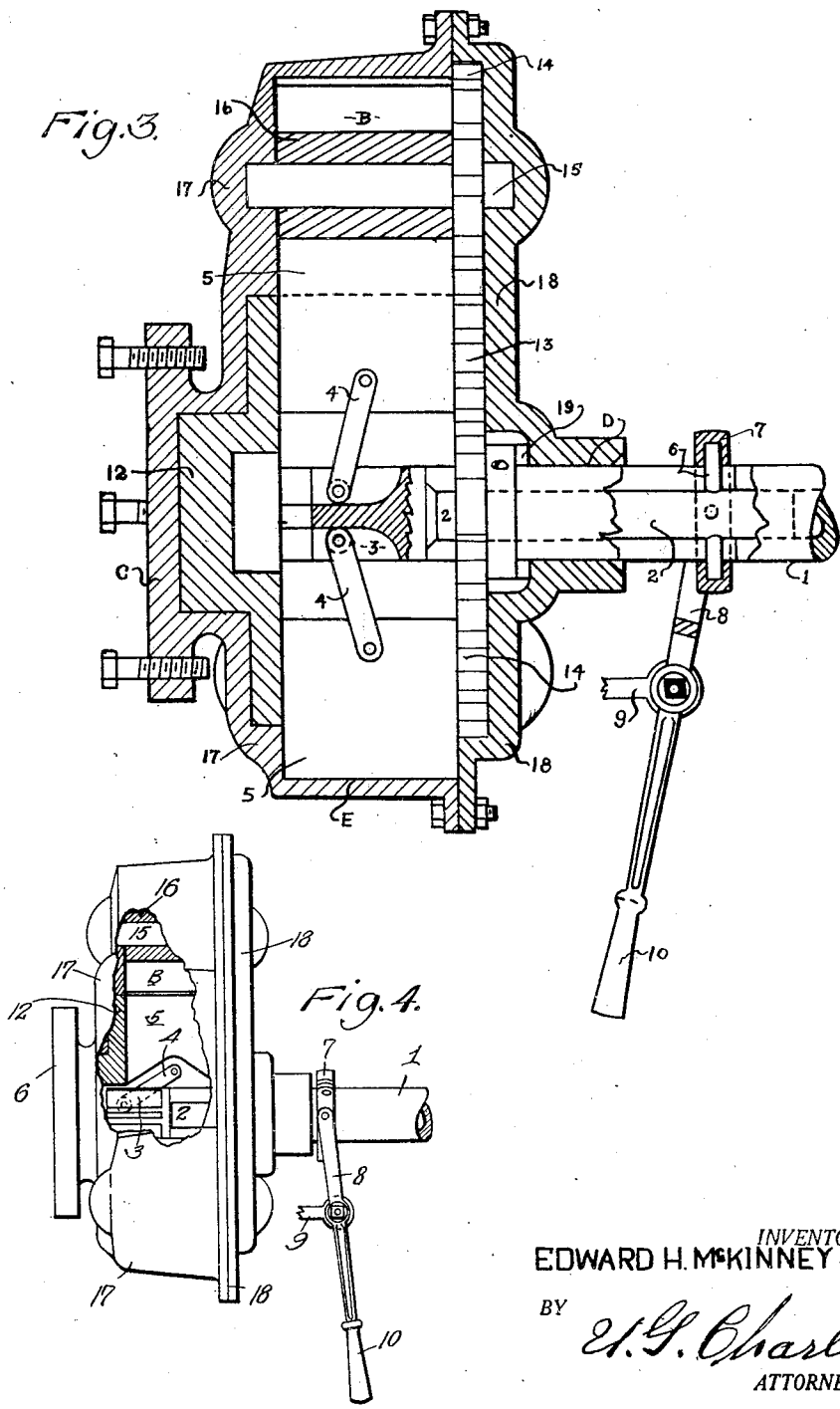

Patented Aug. 28, 1928.

1,682,085

UNITED STATES PATENT OFFICE.

EDWARD H. McKINNEY, OF SALINA, KANSAS, ASSIGNOR TO THE HYDRAULIC SPECIALTY MANUFACTURING COMPANY, OF TOPEKA, KANSAS, A CORPORATION.

HYDRAULIC CLUTCH TRANSMISSION.

Application filed March 23, 1925. Serial No. 17,763.

My invention relates to the transmission and release of torque by means of a hydraulic clutch.

The object of my invention is to provide a clutch to transmit and release a rotating force between a prime mover and a shaft or adjacent shafts, by means of the resisting force resulting from pressure applied to a confined liquid substance.

A further object of my invention is to provide a clutch mechanism which will eliminate the use of friction bands, disks, cones and any other means of transmission or release of power, which is performed through the friction of solid substances in bearing, which results in the inevitable failure of some phase of the operating parts.

A still further object of my invention is to provide a clutch mechanism which has a period of engagement so designed as to bring the driving end, and power receiving end into a direct connection in a smooth and flexible manner independent of the skill of the operator.

A still further object of my invention is to provide a clutch in which no spring tension is employed as the holding means, but of a character that can be operated by the strength of a normal man, regardless of the size of the operating parts and power imposed. These and other objects will be hereinafter more fully explained, reference being had to the accompanying drawings which form a part of this application in which like references refer to like parts throughout the various drawings.

Fig. 3, is a longitudinal section, parts removed for the convenience of illustration and showing the clutch in the engaged position.

Fig. 4, is an elevation with parts removed for convenience of illustration and no holding bolts shown, but the clutch in disengaged position.

Figure 1:
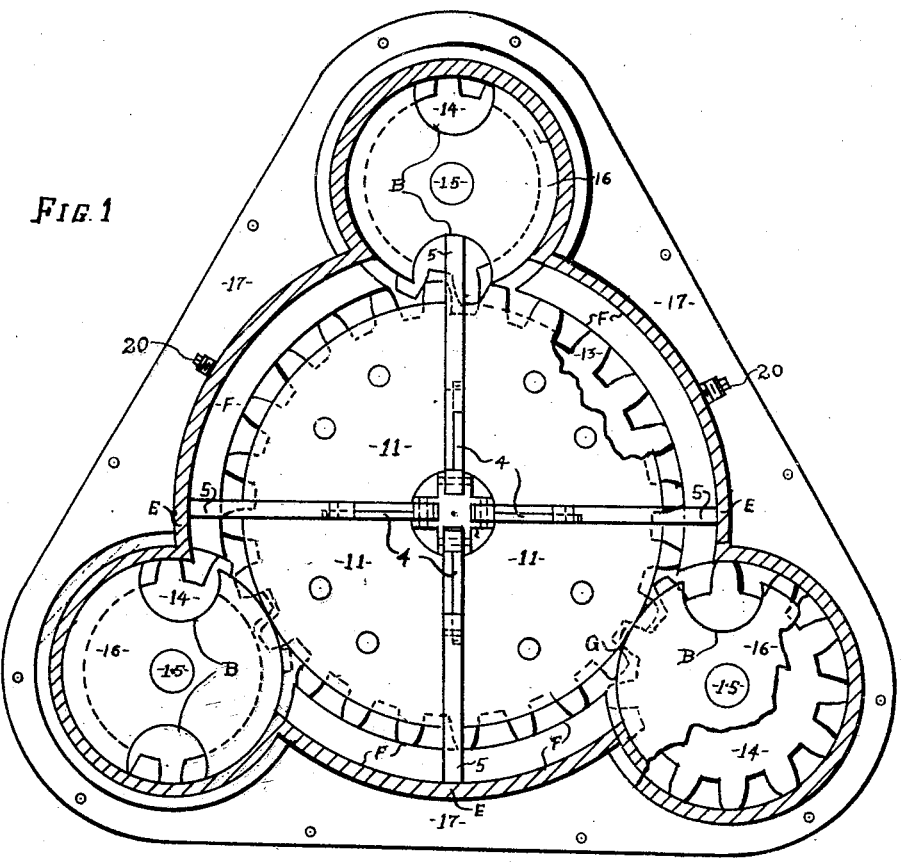
Fig. 1, is an internal view, parts removed for convenience of illustration.
Figure 2:
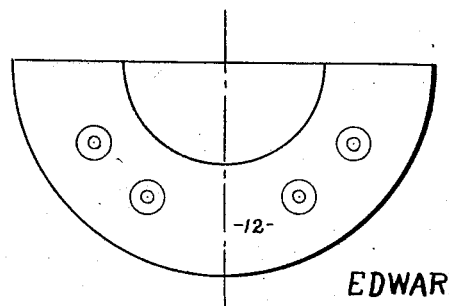
Fig. 2, is a half plan of the end bearing of the rotating mechanism.

The mechanism herein described is mounted on a shaft 1, the connecting end of which is hollow and having interposed therein a shaft 2, on which is mounted a cross head 3. Radially extending therefrom are a plurality of connecting links 4, said links being pivotally connected to the cross head at one end and at the opposite end to blades 5, the said mechanism functioning as a toggle, for opening and closing said blades simultaneously. A pin 6 passes thru shaft 2, said pin engaging in the groove of collar 7, and being slidably mounted in slots 21 in shaft 1, by action of a yoke 8, which is pivotally mounted in a bearing 9 supported by a frame not shown. The said yoke has a handle as at 10, the sweep of which is indicated by dotted line A. Movement of the handle 10, is transmitted to the shaft 2, resulting in a displacement of the cross head 3; such displacement shortens or lengthens the distance between the adjacent edges of the blades 5, in proportion to the length of the connecting links 4, which are guided in their action by quadrants 11, which are rigidly fastened on one end to the bearing 12, and at the opposite side to the gear 13, being rigidly attached to shaft 1. At 14 are shown gears meshing with gear 13, at points 120° apart with a relative speed of two revolutions of 14, to 1 of 13, the ratio applies to this particular arrangement as illustrated. The gears 14 are mounted on the spindles 15 and are integral in motion with the rollers 16, said rollers being of the diameter of the pitch line of the gears and bearing at determined points on the periphery of the quadrants 11 whose radii coincide with the pitch line of the gear 13. The rollers 16 are machined in a longitudinal direction, with a section removed as at B, the depth of said cut being determined by the extreme extension of blades 5, in coincidence with the inside of the adjacent part of the housing 17, the purpose of the cut B being to allow the passage of the blade 5, and is so timed as will be later described. The portion 17 of the housing serves as one bearing end for the rotating parts, a container for the liquid used and as the transmitting part of the housing in general as shown at C, where it is so arranged that a shaft may be rigidly attached by means of a flanged coupling. The part 18 of the housing when bolted to the part 17 serves as the container and bearing points for the gears 13 and 14, and acts as a supporting bearing for the housing in general as shown at D. 19 is a fibrous packing.

It being assumed for the purpose of description that the clutch is installed with a prime mover directly connected to the shaft 1, and the shaft of the mechanism which will receive the delivered power is directly connected to the housing at the point C, the plugs 20 are removed and the interior of the housing is filled to capacity with a fluid substance. When the lever 10 is in position as shown in Fig. 3, the blades 5 are extended against the housing 17 at the points E, the rotation of the shaft 1, is transmitted to blades 5 as previously described, and this rotation tends to displace the liquid contained in the space F between the periphery of the quadrants 11 and the housing 17. This displacement is blocked by means of the rollers 16 when in the positions as indicated at G, and when the retardation has reached its maximum point, the blades 5 will have locked their rotation to the housing 17, and the power applied to the shaft 1, will be directly transmitted to point C. The operation of roller 16 is so timed that any projection of blades 5 will be passed by means of the cut at B, pending maximum compression. When the lever 10 is in position as shown at Fig. 4, under the same operating conditions as heretofore described, the blades 5 recede toward the cross head 3, until their extreme outer edges do not extend beyond the periphery of quadrants 11, and the fluid in the space F is not compressed, thereby allowing the rotation of shaft 1, independent of rotation of the housing and the parts connected thereto, which is the release position of the clutch. An intermediate position of blades 5, as determined by the movement of the handle 10, give the necessary easement of the application of the driving torque. Such modifications may be employed as lie within the scope of the appended claim.

Having fully described my invention, what I now claim as new and desire to secure by Letters Patent is:—

A hydraulic clutch mechanism comprising a drive shaft hollow towards the clutch end in its longitudinal axis; a second shaft coaxial with the drive shaft and operatively engaging for endwise sliding movements within the hollow end of the drive shaft and means for occasioning such endwise movements of the second shaft; a housing member in two sections as a fluid tight enclosure; a gear rigid with the drive shaft within the housing member and an end bearing for said second shaft also within the housing member; three spindles positioned at 120° apart with respect to each other around the second shaft element, and rotatably housed at their opposite ends within bearings in the side elements of the housing member, each spindle rotatably connected to and supporting a roller element with a gear element integral therewith in mesh with the first gear; a plurality of sectional cuts in each roller element; four quadrants rigidly affixed to said end bearing intermediate the first gear and the outer side element of the housing member and spaced apart to provide four slots radiating from the axis of the second shaft; a space F intermediate the quadrants and the housing member as a fluid container; the outer end of the second shaft having the cross-sectional character of a cross, a link pivotally attached to each rib element of said cross, a blade within each quadrant slot pivotally connected to its respective link element, endwise movements of the second shaft operating to transmit contracting or expanding movements to said blades and which under expansion thereof and under gear rotation cause said blades to register with the sectional cuts in the roller elements while serving to create a dam for fluid movements within the space F and correlated parts for clutch purposes.

EDWARD H. McKINNEY.